United States Patent [19]
Killpatrick et al.

[11] Patent Number: 5,406,369
[45] Date of Patent: Apr. 11, 1995

[54] LASER GYRO MICROPROCESSOR CONFIGURATION AND CONTROL

[75] Inventors: Joseph E. Killpatrick, Minneapolis; Keith R. Fritze, Minnetonka; Dale F. Berndt, Plymouth, all of Minn.

[73] Assignee: Honeywell Inc., Minneapolis, Minn.

[21] Appl. No.: 922,612

[22] Filed: Jul. 17, 1992

[51] Int. Cl.$^6$ .................... G01B 9/02; H01S 3/083
[52] U.S. Cl. ........................ 356/350; 372/94
[58] Field of Search ................. 356/350; 372/94

[56] References Cited

U.S. PATENT DOCUMENTS

| | | | |
|---|---|---|---|
| 4,299,490 | 11/1981 | Cahill et al. | 356/350 |
| 4,342,517 | 8/1982 | Johnson et al. | 356/350 |
| 4,702,600 | 10/1987 | Handrich et al. | 356/350 |
| 4,718,766 | 1/1988 | Greenstein | 356/350 |

Primary Examiner—Stephen C. Buczinski
Attorney, Agent, or Firm—Robert B. Leonard; Ron Champion

[57] ABSTRACT

A laser gyro configuration and control using a microprocessor. The microprocessor has a high speed peripheral transaction system which communicates through a high speed Universal Asynchronous Receiver Transmitter (UART) to a serial to parallel converter through a five Byte first in first out (FIFO) to an external system processor. The external system processor sends information in a serial fashion through a single byte parallel to serial converter to the high speed UART. Various information including gyro parameter load commands, gyro control commands, gyro status commands, and gyro calibration and diagnostic commands are sent over channels. The system provides a high speed method of controlling the laser gyro and configuring it with a processor with serial transmit and receive lines.

9 Claims, 4 Drawing Sheets

UART OUTPUT
COMMAND BUFFER

INPUT FRAME

LASER GYRO MICROPROCESSOR CONFIGURATION AND CONTROL

This invention relates to a method of configuring and controlling a laser gyro using a microprocessor and more particularly to a method of configuring and controlling a laser gyro with a high speed microprocessor based communication system.

BACKGROUND OF THE INVENTION

Ring laser angular rate sensors, also called laser gyros, are well known in the art. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-loop path. Such a laser gyro may incorporate a microprocessor controller.

Laser gyros that utilize microprocessors for their control require that inertial navigation information, control information, test information, and status information be communicated to external systems including an inertial navigation system or a test system. The inclusion of a microprocessor in the laser gyro allows the implementation of new capabilities such as sending autonomous control functions and self testing along with self calibration and self diagnostics. This new capability requires the transmission and reception of a broad spectrum of data, some of which occurs at a high frequency rate.

SUMMARY OF THE INVENTION

The invention provides a laser gyro configuration and control mechanism that utilizes an onboard microcontroller with a high speed Universal Asynchronous Receiver Transmitter (UART) that interfaces through a transmit line and a receive line to an external system. The microprocessor communicates through a set of predetermined registers that have a structure lending itself to high speed data communications. The microprocessor sends a command tag along with inertial navigation data and status data. The external system communicates to the laser gyro through a similar mechanism. The laser gyro includes a personality storage module in nonvolatile memory that stores gyro operating parameters for start up.

It is an object of the invention to provide a laser gyro with a high speed data communications system.

It is yet another object of the invention to provide a laser gyro high speed interface that uses a microprocessor controlled UART and a transmit line and receive line.

It is yet a further object of the invention to provide a laser gyro high speed interface to an external system that uses an output command frame and input command frame.

Other objects, features and advantages of the present invention will become apparent to those skilled in the art through the description of the preferred embodiment, claims and drawings herein where like numerals refer to like elements.

DESCRIPTION OF THE PREFERRED EMBODIMENTS

Figure 1:
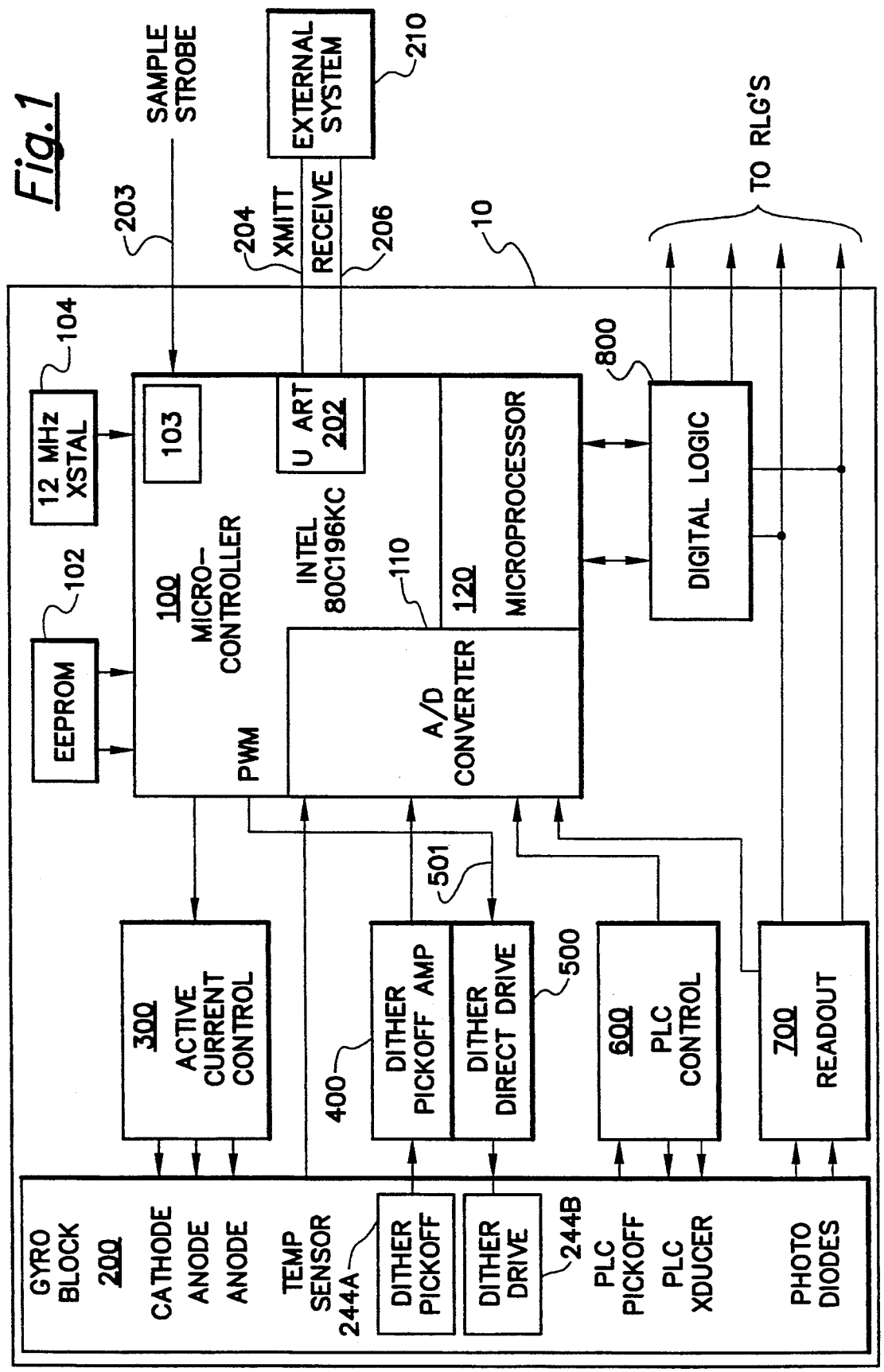
FIG. 1 shows the laser gyro apparatus of the invention with the high speed interface.

Referring now to FIG. 1 which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principles of the invention and not by way of limitation. Laser gyro system 10 includes a controller 100, a laser gyro block 200, an active current control 300, dither pickoff amplifier 400, direct digital dither drive 500, a path length control (PLC) device 600, a readout 700, and digital logic 800. The controller 100 further includes a Universal Asynchronous Receiver Transmitter (UART) 202 which communicates to an external system 210 through transmit line 206 and receive line 204.

Figure 2:
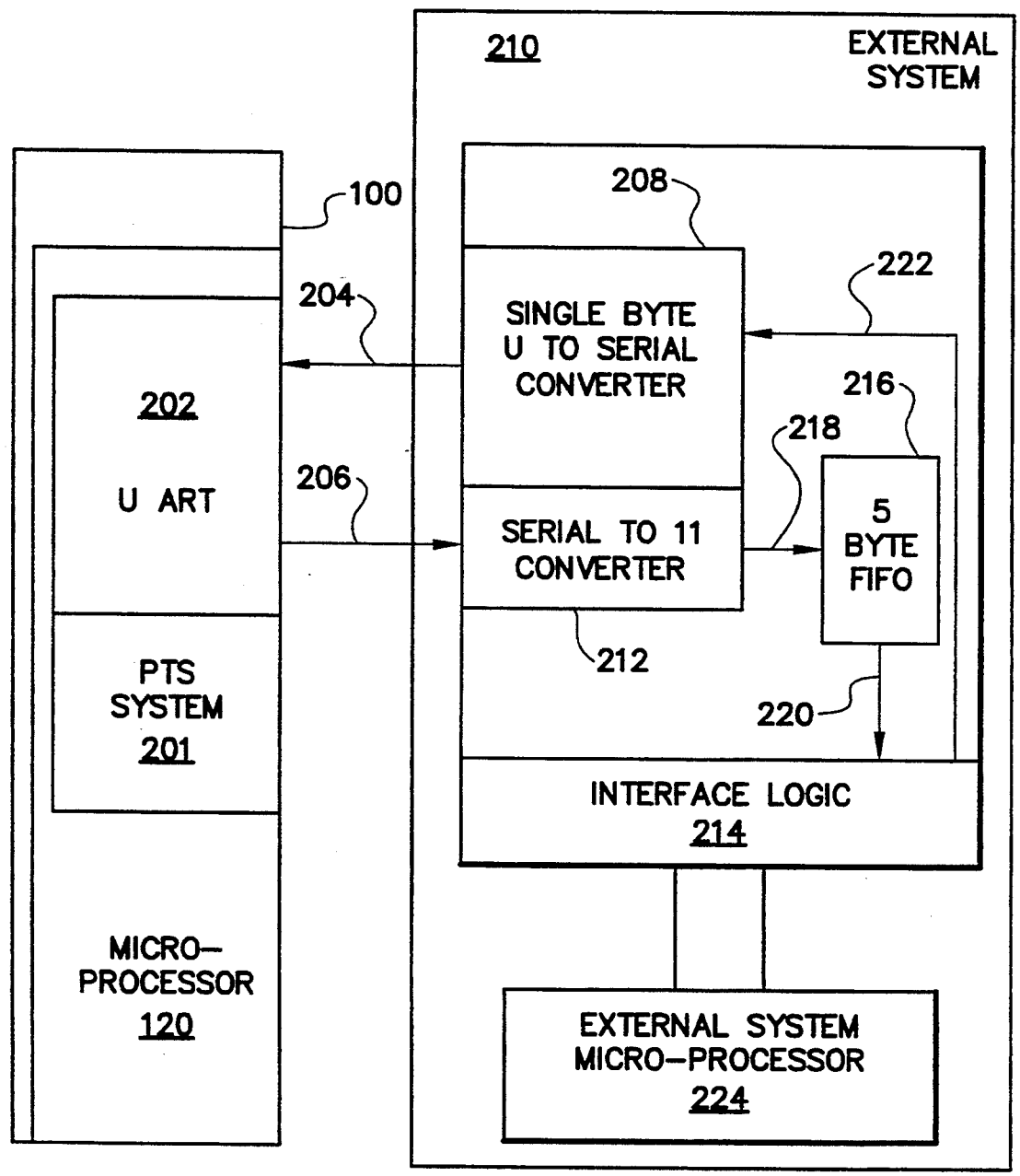
FIG. 2 shows the apparatus of the invention in a detailed schematic drawing to provide a high speed interface for a laser gyro.

Now referring to FIG. 2 which shows a hardware diagram of the apparatus of the invention. The apparatus is used to interface a laser gyro controller 100 to an external system 210. The laser gyro system 10 includes a microprocessor 120. The microprocessor 120 includes a high speed UART 202 controlled by a peripheral transaction system (PTS) 201. The UART 202 communicates to the external system 210 on transmit line 206 and receive line 204. Line 206 is connected to the external system 210 through a serial to parallel converter 212. The serial to parallel converter 212 provides information on line 218 to a five Byte FIFO 216. The five Byte FIFO 216 interfaces to processor interface logic 214 which provides information to an external system processor 224 for further processing. The interface logic 214 provides commands from the external system processor 224 through serial interface line 222 to a single byte parallel to serial converter 208. The single byte parallel to serial converter 208 provides information to the laser gyro microprocessor 120 on receive line 204.

The apparatus of FIG. 2 provides a way of communicating high speed serial data to a queue in the serial to parallel converter 212. The system provides a five Byte FIFO 216 with high speed interface data that can be accepted by the external processor 224. The apparatus of FIG. 2 provides a bidirectional means by which information can flow between the two processors 120, 224 at a very high rate.

The microprocessor controlled configuration and control of the laser gyro 10 is accomplished through the use of a command set. These commands are generally defined in four types. The four command types for the laser gyro are, (1) the parameter load commands, (2) the gyro control commands, (3) the gyro read status commands, and (4) the gyro calibration and diagnostics commands.

(1) PARAMETER LOAD COMMANDS

Parameter load commands provide a way of loading constants into the microprocessor's EEPROM 102. Parameter load commands can be of two types. The first type is a one-word command, the second type is a two-word command. In one example embodiment of the invention a word is defined as sixteen bit unsigned quantity.

Two-word parameter load commands fall into the types of commands requiring a two byte physical address in the EEPROM 102, for example: command 0 hexadecimal loads the K1 constant into the EEPROM at word addresses 0 and 1; and command 1 loads the constant K2 into word addresses 2 and 3, etc. These commands occupy the 0–F hexadecimal address location. These constants occupy word addresses 0–1FH in the EEPROM 102. The following table lists two-word parameter load commands.

TABLE A

1. CMD 0H—Load compensation constant K1.
2. CMD 1H—Load compensation constant K2.
3. CMD 2H—Load compensation constant K3.
4. CMD 3H—Load compensation constant K4.
5. CMD 4H—Load compensation constant KI.
6. CMD 5H—Load compensation constant KI2.
7. CMD 6H—Load compensation constant K7.
8. CMD 7H—Load compensation constant K9.
9. CMD 8H—Load Serial Number.
10. MD 9H—Load Build Date.
11. CMD AH—Load Alignment X.
12. CMD BH—Load Alignment Y.
13. CMD CH—Load Current (min,max) Limits; microamperes.
14. CMD DH—Load Power (min,max) Limits. Power is in milliwatts.
15. CMD EH—Load initial Dither stripper AGC gain constant.

One-word parameter load commands are loaded into EEPROM 102 starting at address 40H. These command codes represent the physical address in the EEPROM 102 where data is to be stored. These commands are listed below with explanations in Table B.

TABLE B

1. CMD 20H—Load Operating Hours. This command initializes the operating hours to a value specified in command parameter 1 into the EEPROM.
2. CMD 21H—Load Dither Frequency. This command loads the dither frequencies, in Hz, into the EEPROM.
3. CMD 22H—Load Dither Command Angle. This command loads the dither command angle into the EEPROM. This value is used by the modular gyro system during power-on to set the initial command angle.
4. CMD 23H—Load PLC Mode Ref Voltage. This command loads the PLC mode reference voltage into the EEPROM.
5. CMD 24H—Set laser run current. This is a 4 bit value to set the initial laser run current.

END

(2) GYRO CONTROL COMMANDS

Gyro control commands are those commands that either set the gyro operating parameters or alter gyro dither angle or write the parameters check sum. These commands include a "set gyro operating parameters" command, an "alter gyro dither angle" command, a "write parameters check sum" command, and "gyro read status commands". The gyro read status commands include a "read current control loop current" command, a "read temperature" command, a "readout intensity monitor" command, a "read operating hours" command, a "read time to fail" command and diagnostic and calibration commands.

The set gyro operating parameters command changes the operating modes of the gyro. Various bits are associated with various operating states of the gyro. The command code for the "set gyro operating parameters" command is 30H. Bit 0 of the command selects either constant current or constant power operation. Bit 1 is used to restart the system. Bit 2 is used to turn the compensation on or off for the gyro. Bit 3 is used to turn the noise for the gyro on or off.

The next command used in the gyro control command set is the "alter gyro dither angle" command. This command allows the dither angle to be altered to a value specified by the first parameter word in the command. The command code for this command is 31H.

The next command for the gyro control command set is the "write parameters check sum" command. This command generates an overall check sum on the parameters currently in the EEPROM 102 and stores this value in the EEPROM 102. This check sum is used to determine whether or not the EEPROM 102 was loaded with the correct information or expected information.

(3) GYRO READ STATUS COMMANDS

The gyro read status commands allow gyro system functions to be monitored. These commands begin at address 40H. The first read status command is command 40H which is a "read current control loop current" command. This command returns the current control loop current from the gyro 10. The information returned is in microamperes. A "read temperature" command, address 41H, returns the current gyro temperature in degrees Kelvin. A "readout intensity monitor (RIM)" command, address 42H, returns the current RIM signal level. A "read operating hours" command returns the number of hours to the nearest hour that the gyro 10 has been in active operation. This command's address is 43H. A "read time to fail" command, address 44H, returns the remaining number of hours the gyro has until a failure may occur as, for example, predicted by a lifetime prediction method. Command addresses 50H–5FH read the calibration constants used for the gyro.

(4) GYRO CALIBRATION AND DIAGNOSTICS

The final commands are the enter calibration mode or diagnostic mode commands which are commands that enable the gyro to execute routines to calibrate itself or diagnose potential problems.

Figure 3:
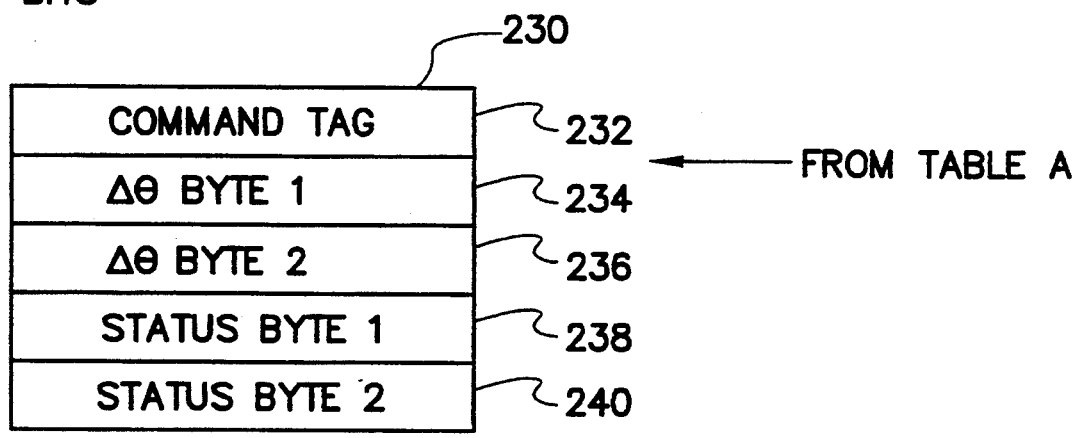
FIG. 3 shows the output frame structure for the command data format sending data from the laser gyro to the external system processor.

Referring now to FIG. 3 which shows the structure of the UART output command buffer for the UART 202 in controller 100. When information is sent from the controller 100 to the external system processor 224 the information is transmitted in a five byte structure called a frame. The output buffer frame 230 comprises a command tag 232, a delta theta byte one 234, a delta theta byte two 236, a status byte one 238, and a status byte two 240. The command tag 232 is a reference to the type of operational status which is being returned. The delta theta byte one 234 and delta theta byte two 236 are the dither stripped, compensated inertial navigation measurements of the laser gyro 10. Status byte one 238 and status byte two 240 are the information resulting from the command.

The serial output data character format is asynchronous and 10 bits in length in one embodiment of the invention. The data is in the format of one start bit, one stop bit, and 8 data bits. In one embodiment of the invention the maximum clock rate is 12 megahertz resulting in a 750 Kbaud communication rate.

Figure 4:
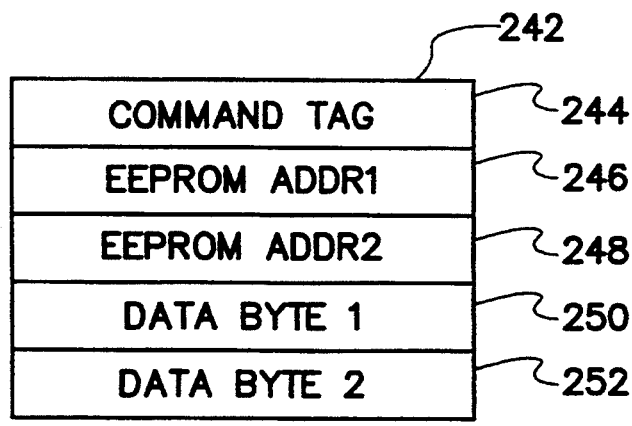
FIG. 4 shows the input frame buffer for sending data from the external system to the laser gyro.

Now referring to FIG. 4 which shows the laser gyro of the invention's input frame format. The input frame 242 is comprised of a number of elements. The first element is a command tag similar to the output buffer frame 230. Command tag 244 provides the microprocessor 120 of the laser gyro a validity flag used to verify a write command. The EEPROM address one 246 and EEPROM address two 248 contain the location in the EEPROM 102 of the data to be stored. The data byte one 250 and data byte two 252 provide the actual data to be stored into the EEPROM 102 at EEPROM address one 246 and EEPROM address two 248.

Data is sent through the output channel from the gyro 10 to the external system 210 continuously at a predetermined update rate. The update rate is equal to the sample clock rate. The sample rate provide current inertial navigation data to the external system 210 from the microprocessor 120. The data provided may also include other information encoded in the status bytes.

Figure 5:
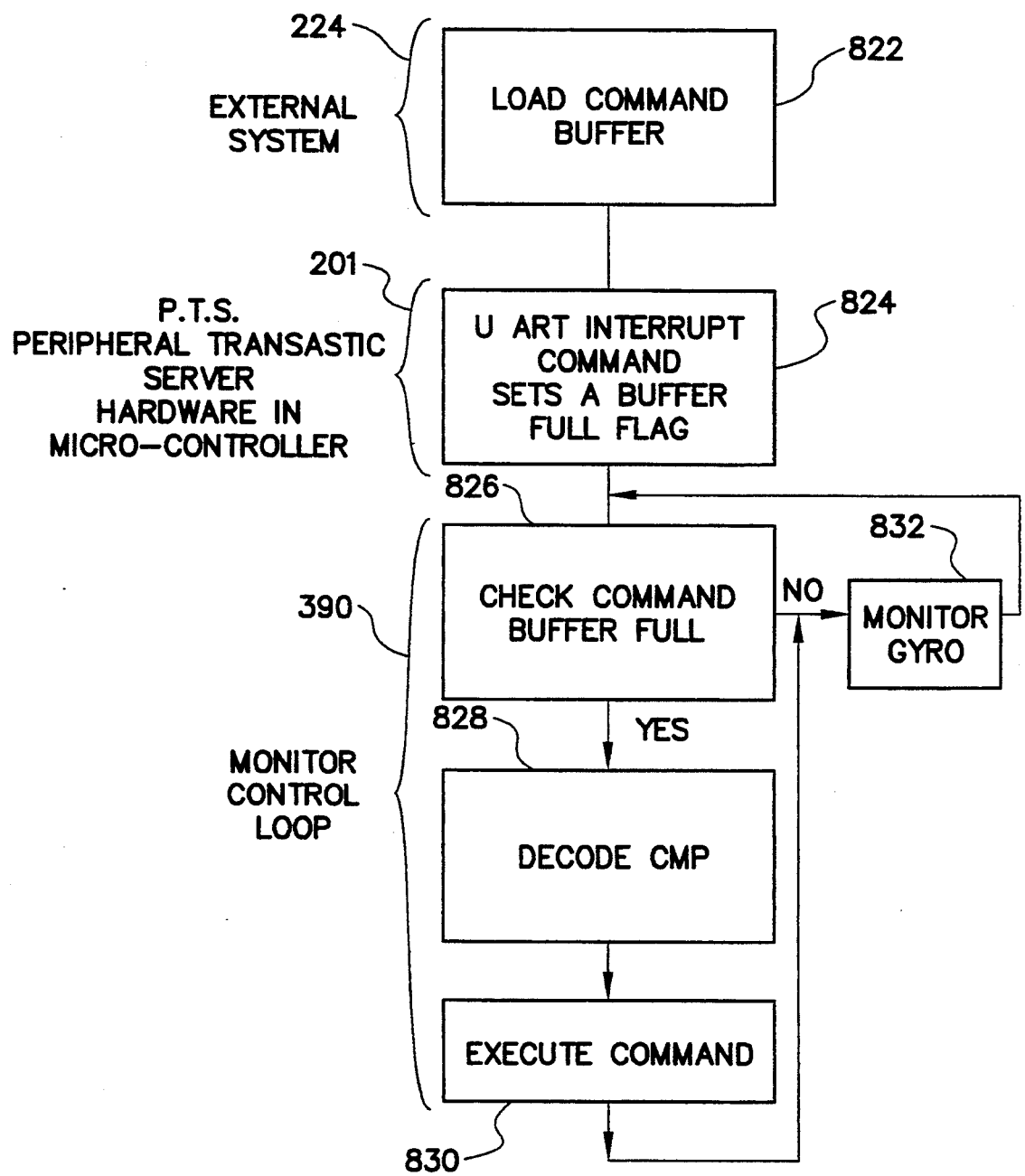
FIG. 5 shows a method of communicating between the external system and the laser gyro.

Now referring to FIG. 5 which shows the method of the invention used to communicate between an external system 210 and the system controller 100 for the laser gyro 10. The external system 210 could alternately include an inertial navigation system or a laser gyro test system. The external system 210 is responsible for loading a command into the command buffer frame 230 at step 822. The command structure is shown in more detail with reference to FIG. 3 as discussed hereinabove. The command is communicated over the receive line 204.

At the end of the peripheral transaction server interrupt the "command buffer full" flag is set. The UART 202 generates an interrupt which sets the "command buffer full" flag in step 824. The process of FIG. 5 then flows to enter the monitor control loop 390 and at step 826 checks whether or not the command buffer is full. If the command buffer is not full the process flows to step 832 to continue execution of the monitor control loop 390. If the command buffer frame 230 is full the process flows to decoding the command in step 828 and the process executes the command decoded in step 828 and step 830. The process then flows to step 832 to the gyro. The process then flows to check the "command buffer full" flag in step 826 and repeats.

In one alternate embodiment of the invention the laser gyro microprocessor controller further includes a personality storage module which may alternatively be in a second EEPROM or nonvolatile memory 103. The nonvolatile memory personality storage module stores certain operating characteristics of the gyro such as the path length control mirror positions and other operating characteristics of the gyro. The personality storage module also stores system specific information that may vary from system to system. This system specific information is determined at build time during the manufacturing process. These generating characteristics may be read or updated by the external system 210 using the communication apparatus of the invention.

In one embodiment of the invention the controller 100 is comprised of the Intel 80C196KC Microcontroller.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, the configuration and control loop method of the invention may optionally delete process steps relating to Random Drift Improvement and gyro life prediction.

What is claimed is:

1. A laser gyro configuration and control apparatus, comprising: a laser gyro having at least one control input; laser gyro control means connected to at least one control input to control the laser gyro in response to configuration and control commands; an external system connected to the laser gyro control means, said external system providing configuration and control commands to the laser gyro control means; means for communicating connected from the external system to the laser gyro control means, said means for communicating having a transmit line and a receive line to transmit and receive data from the external system; wherein the means for communicating communicates a command comprising:
   (a) a first delta theta byte comprised of a plurality of data bits encoding a first byte of an angular displacement of the laser gyro;
   (b) a second delta theta byte comprising a second byte of the angular displacement of the laser gryo;
   (c) a first status byte comprised of a plurality of bits comprising a status of the laser gyro; and
   (d) a second status byte comprised of a plurality of bits describing a status of the laser gyro.

2. A laser gyro configuration and control apparatus comprising:
   (a) a first serial communication means for communicating wherein the first serial communication means communicates a first serial bit stream on a serial output line and receives a second serial bit stream on a serial input line;
   (b) a second serial communication means for communicating connected to receive serial data from the first serial communication means, wherein the second serial communication means has a serial parallel converter connected to receive data from the first serial communication means on the serial output line and further having a parallel byte output;
   (c) a third serial communication means for converting a parallel byte to serial byte data connected to the serial input line to send serial data;
   (d) a multibyte first in first out queuing means connected to receive parallel data from the second serial communication means such that the information converted from serial to parallel is communicated to the multibyte first in first out queuing means in a first in first out fashion wherein the first in byte is sent to a FIFO output line;

(e) an interface logic means connected to the FIFO output line to receive data bytes from the multibyte first in first out queuing means having an external processor interface;

(f) an external microprocessor system used for controlling a laser gyro connected to the external processor interface;

(g) a peripheral transaction system;

(h) a receiver-transmitter means connected to the peripheral transaction system such that the peripheral transaction system schedules communications between the first, second and third serial communication means; and (i) a control means for controlling the peripheral transaction system to enable the communication of the serial data from the first serial communication means, second serial communication means, and third serial communication means.

3. The laser gyro configuration and control apparatus of claim 2 wherein the control means further comprises an Intel 80C196KC Microcontroller.

4. The apparatus of claim 2 wherein the first serial communication means, the second serial communication means and the third serial communication means communicates a command tag comprising:

(a) a first EEPROM address byte comprised of a plurality of bits;

(b) a second EEPROM address byte comprised of a plurality of bits, (c) a first data byte; and (d) a second data byte.

5. The laser gyro configuration and control apparatus of claim 2 wherein the laser gyro further comprises operating parameters and wherein the control means further comprises a personality storage means to store the operating parameters.

6. The laser gyro configuration and control apparatus of claim 5 wherein the personality storage means further comprises a nonvolatile memory.

7. The laser gyro configuration and control apparatus of claim 6 wherein the personality storage means further comprises an EEPROM.

8. The apparatus of claim 2 wherein the serial data further comprises a command that has a description following the structure of a command tag constructed of a plurality of data bits.

9. The apparatus of claim 2 wherein the serial data comprises:

(a) a first delta theta byte comprised of a plurality of data bits encoding a first byte of an angular displacement of the laser gyro;

(b) a second delta theta byte comprising a second byte of the angular displacement of the laser gyro;

(c) a first status byte comprised of a plurality of bits comprising a status of the laser gyro;

(d) a second status byte comprised of a plurality of bits describing a status of the laser gyro.

* * * * *